Sept. 3, 1929.  J. VAN NORTWICK  1,727,021
CONVEYER FOR CORN PICKERS, HARVESTERS, AND THE LIKE
Filed Dec. 20, 1926
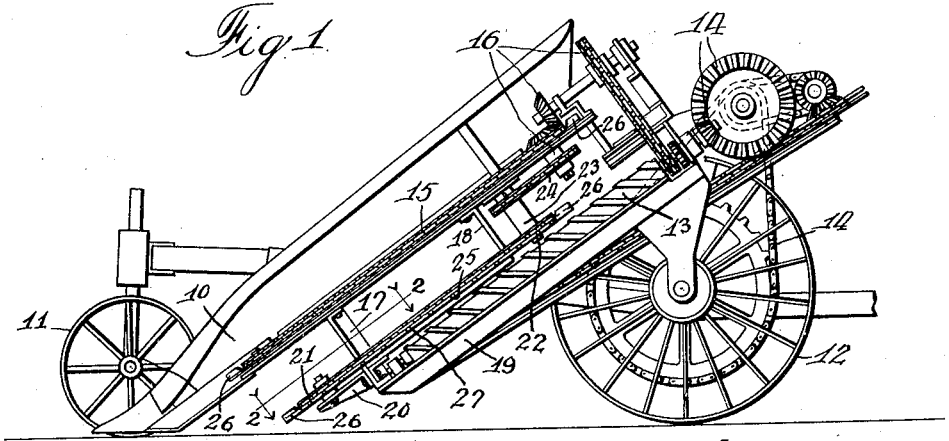
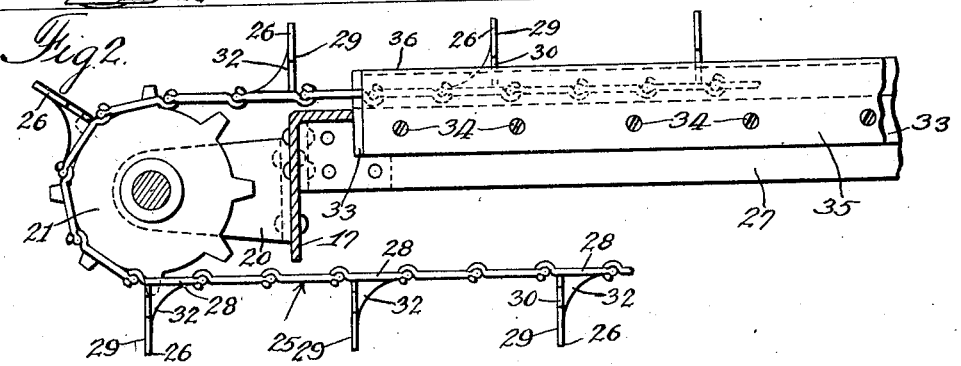
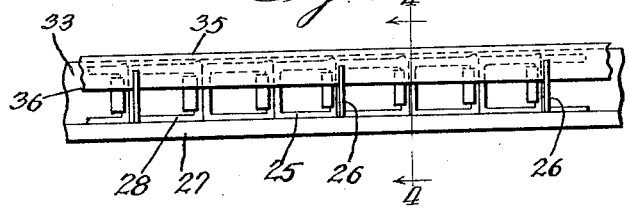
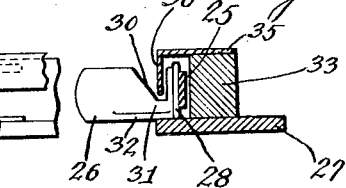
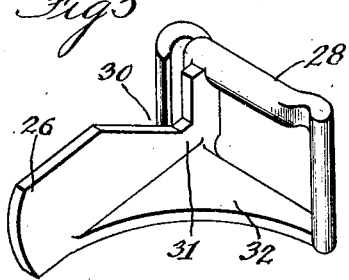
Inventor:
John Van Nortwick
By Arthur L. Sprinkle
Atty.

Patented Sept. 3, 1929.

1,727,021

UNITED STATES PATENT OFFICE.

JOHN VAN NORTWICK, OF BATAVIA, ILLINOIS, ASSIGNOR TO APPLETON MANUFACTURING COMPANY, A CORPORATION OF ILLINOIS.

CONVEYER FOR CORN PICKERS, HARVESTERS, AND THE LIKE.

Application filed December 20, 1926. Serial No. 155,996.

This invention relates to corn pickers, harvesters and the like, and particularly to the conveyer or gathering chains and to the chain guides and guards therefor.

The present invention is particularly adaptable for use on corn pickers, or the like, wherein the standing stalks of corn are received between pairs of chains and conveyed rearwardly to snapping rolls which pick the ears from the stalks, after which the ears are usually conveyed to husking mechanism, a wagon or other suitable receptacle.

One object of the present invention is to provide chain links having flights of novel construction formed thereon, the said flights being constructed to provide a relatively broad, flat face for engagement with the material to be operated upon.

Another object of the invention is to provide an efficient and practical chain guide which will maintain substantially complete control of the chain throughout the entire working portion of its movement without any interference with the flights of the chain, and which will serve, at the same time, as an efficient guard to prevent leaves, stalks or portions thereof, from contact with, and possible fouling of the chain.

Further objects of the invention are to provide a device of simple construction, which is inexpensive to manufacture, and to improve devices of the character described, in sundry details hereinafter described and particularly pointed out in the appended claims.

One embodiment of the invention is shown, for illustrative purposes, in the accompanying drawing, in which Fig. 1 is a side elevation of a portion of a corn picker showing the application of my improved chain link construction thereto, and illustrating one type of machine to which my invention may be applied.

Fig. 2 is a plan view of a portion of the chain and guide, viewed substantially as indicated by the line 2—2 of Fig. 1.

Fig. 3 is a face view, in elevation, of the operating or working side of a chain embodying my improved link construction, and illustrating the relative arrangement and co-operation of the chain guide or guard and chain.

Fig. 4 is a sectional elevation taken substantially as indicated by the line 4—4 of Fig. 3.

Fig. 5 is an enlarged perspective view of my improved chain link embodying features of my invention.

In the illustrative embodiment, my invention is shown as applied to a corn picker, and attention is directed particularly to its application to what is known among those skilled in the art as the lower or "third" chain positioned adjacent one of the snapping rolls, but it will be understood that the invention may be applied to corn and cane harvesters, or the like, wherein the gathering or other conveyer chains are employed for conveying the material through the machine.

The corn picker illustrated in the accompanying drawing is of the type wherein a pair of divider boards provided with gathering chains are adapted to straddle the rows of corn in a manner to permit the conveying flights on the chains to engage stalks and pass them rearwardly between the snapping rolls where the ears are picked from the stalks and conveyed by suitable means to husking mechanism, a wagon, or other receptacle. For convenience of illustration only one of the divider boards, gathering chains and snapping rolls have been shown in the accompanying drawing, but it will be well understood by those skilled in the art that these elements are arranged in pairs and suitably positioned on opposite sides of the rows of corn in a manner to properly engage and operate on the stalks and ears.

In the embodiment shown, the picker comprises a frame including a pair of divider boards 10 adapted to straddle the rows of corn in a well known manner as the machine is transported over a field on supporting wheels 11 and 12. A pair of snapping rolls 13 mounted on the frame are connected to and driven through suitable gearing 14 by the wheel 12, and the gathering chains 15, suitably mounted on the divider boards 10, are driven by well known gearing 16 operatively connected to the driving mechanism of the snapping rolls.

Suitably positioned along one of the divider boards 10 and depending therefrom are a plurality of hangers 17 and 18, the former serving as a support for a portion 19 of the main frame of the machine, and also the forward bearing of one of the snapping rolls 13.

Secured to the hanger 17 and extending forwardly thereof is a bracket 20 on which is rotatably mounted a sprocket wheel 21, and supported by the divider board 10, preferably adjacent the hanger 18 is a trunnion or stub shaft 22 on which is rotatably mounted a double sprocket member 23 operatively connected with the gearing 16 by means of a sprocket chain 24 by which the double sprocket 23 is driven.

Trained around the sprocket wheel 21 and the double sprocket member 23 is a lower or "third" chain 25 having a plurality of laterally extending flights 26 mounted thereon, and suitably supported by and between the hangers 17 and 18 is a chain supporting member 27 over which the chain 25 is adapted to pass and be supported in a manner to cause the flights 26 on the working side of the chain to traverse a path extending longitudinally of and immediately above the top face of the upper snapping roll 13 for keeping the roll free from leaves, broken stalks and other refuse or débris, which, if permitted to accumulate would tend to clog and seriously interfere with the operation of the snapping rolls, thereby impairing the efficient operation of the machine. Furthermore, the flights 26 assist materially in the proper discharge of the snapped or picked ears from their position on top of the snapping rolls to the means for conveying them to husking mechanism, wagons or other suitable receptacles.

Heretofore when chains have been used adjacent the snapping rolls, the said chains have been provided with flights having relatively narrow contact faces or edges in order that a chain guide and guard might sufficiently cover the chain to retain efficient control of the chain in its working movement, and to effectually protect the chain from fouling by reason of leaves or parts of the stalks entangled in the chain.

This form of flight has been extremely objectionable owing to the tendency of the narrow contact face or edge of the flight to pass under any material on top of the rolls, thus permitting parts of broken stalks, leaves or other débris to accumulate, thereby seriously interfering with the efficient operation of the machine.

My invention is intended to provide a construction and arrangement whereby these objectionable features are overcome, and the invention in its present form comprises conveying means shown, in the present instance, as a flexible link belt or chain 25 trained over the sprocket wheels 21 and 23 rotatably mounted on the bracket 20 and divider board 10, respectively, the sprocket wheel 23 being operatively connected by means of the chain 24 to the gearing 16 in a manner to be driven thereby, and positioned at suitable intervals along the chain 15 are the conveyer flights 26. These flights, formed preferably integral with certain of the links 28 of the chain, are positioned to extend laterally therefrom and transversely thereto, and are provided with relatively broad flat contact faces 29, shown, in the present instance, as of a width substantially equal to the width of the chain 25, and formed preferably, in the upper edge of the flight 26, and adjacent one end thereof is a notch or recess 30, the sides of which are tapered and extend inwardly in a manner to form a relatively narrow neck portion 31 between the link 28 and body portion of the flight. If desired, the flights 26 may be provided with reinforcing webs 32 extending between the flights and body of the links 28 for increasing the rigidity of the flights and resisting the pressure of stalks, leaves or other débris against the contact faces thereof.

Mounted on the chain supporting member 27 adjacent the chain 25 is a longitudinally extending chain guide 33 for retaining the working side of the chain in proper alignment and preventing sagging or backing away of the chain due to contact of the trash or débris with the flights. Secured to the guide 33 by screws 34, or connected thereto by other suitable means, is a guide and guard member 35 adapted to extend longitudinally of and overlie the chain 25, the said member being provided with a depending apron or flange portion 36 adapted to occupy a position within the notches 30 in a manner to cover a substantial portion of the outer face of the chain 25, and to provide in conjunction with the member 27, a relatively narrow slot through which the narrow neck portions 31 of the flights 26 are adapted to pass. It will be observed that the guide 33 and the guide and guard member 35 in conjunction with the member 27 surround a substantial portion of the chain 25, and that the portion 36 of the member 35, in addition to forming a guide along the outer face of the chain, provides an efficient shield or guard for effectually preventing the leaves or portions of the stalks from becoming entangled in the chain, and the consequent possible fouling thereof. It will be observed also that while retaining control of the chain 25 in its working movement, and providing efficient protection for the chain from contact with leaves, stalks, and the like, the present invention, by reason of the peculiar and novel construction and arrangement of the flights 26 including the notches 30, permits engagement of the material by the relatively broad contact faces 29 of the flights, and eliminating the possibility of the material accumulating and becoming entangled with the mechanism, and insuring efficient operation of the machine and the proper discharge of snapped or picked ears from the top of the rolls.

It will be obvious to those skilled in the art, that, as indicated in Fig. 1, the features of the present invention including the novel form of conveyer flights and the co-operating guide and guard members may be used to advantage in connection with the gathering chains 15, providing relatively broad contact faces for engagement with the stalks, thereby reducing to a minimum the possibility of fracturing or otherwise damaging the stalks and eliminating the possibility of broken stalks or the like becoming entangled with the gathering mechanism.

Obviously, the present invention is not limited to the specific details of construction and arrangement shown and described, since the same may be variously modified without departing from the spirit and scope of the invention, as set forth in the appended claims.

What I claim as my invention and desire to secure by Letters Patent is:

1. In a conveyer, the combination of an endless belt, a plurality of broad faced flights carried thereby and extending horizontally therefrom, said flights having reduced portions formed at one of their sides adjacent one of their end portions, and a guide including a shield extending longitudinally of and surrounding said belt and having a slot formed therein adjacent its lower side and adapted to receive the said reduced portions of said flights in a manner to permit their passage longitudinally of said shield and guide.

2. Conveying means including a chain link, and a flight carried by said link, said flight having a reduced portion formed adjacent one of its edges.

3. Conveying means including a chain link, a flight formed integrally with said link and having a reduced portion formed at one of its edges adjacent one end thereof, and reinforcing means formed integrally with said link and flight adjacent said reduced portion.

4. Conveying means comprising a chain link, a flight formed integrally therewith and extending laterally therefrom, said flight being of a width substantially equal to the width of said link and having a reduced portion at one edge thereof produced by an inwardly tapered recess formed in the opposite edge of said flight and adjacent one end thereof.

5. The combination in a corn picker having gathering chains and a pair of snapping rolls positioned beneath said chains, of a supporting member adjacent one of said rolls, a chain mounted on said member, a plurality of flights extending laterally from said chain in a manner to overlie said last mentioned roll, the respective flights having a notch formed in one edge thereof, and a guide partially surrounding said chain and provided with a portion adapted to enter said notches.

6. The combination in a corn-picker having gathering chains and a pair of snapping rolls positioned beneath said chains, of a supporting member adjacent one of said rolls, a chain mounted on said member, a plurality of flights extending laterally from said chain and overlying said last mentioned roll in a manner to traverse a path extending longitudinally of and immediately above the top face of said roll, the respective flights having a notch formed in the upper edge thereof, and a guide mounted on said member and co-operable therewith in a manner to partially surround said chain and having a portion adapted to enter the notches formed in said flights.

7. The combination in a corn picker having gathering chains and a pair of snapping rolls positioned beneath said chains, of a supporting member positioned adjacent and extending substantially parallel with respect to one of said rolls, an endless chain mounted on said member, a plurality of conveyer flights extending laterally from said chain, the flights on the working side of the chain overlying said last mentioned roll in a manner to traverse a path extending longitudinally of and immediately above the top face of said roll, a reduced portion formed adjacent one edge of said flights, and a guide including a shield mounted on said member and partially surrounding said chain, said shield being adapted to co-operate with said member in a manner to form a longitudinally extending slot for permitting the passage therethrough of the reduced portion of said flights.

In testimony whereof I have signed my name to this specification, on this 16th day of Nov., A. D. 1926.

JOHN VAN NORTWICK.